March 4, 1924.
J. A. COLE
MEASURING INSTRUMENT
Filed Feb. 7, 1921
1,485,831
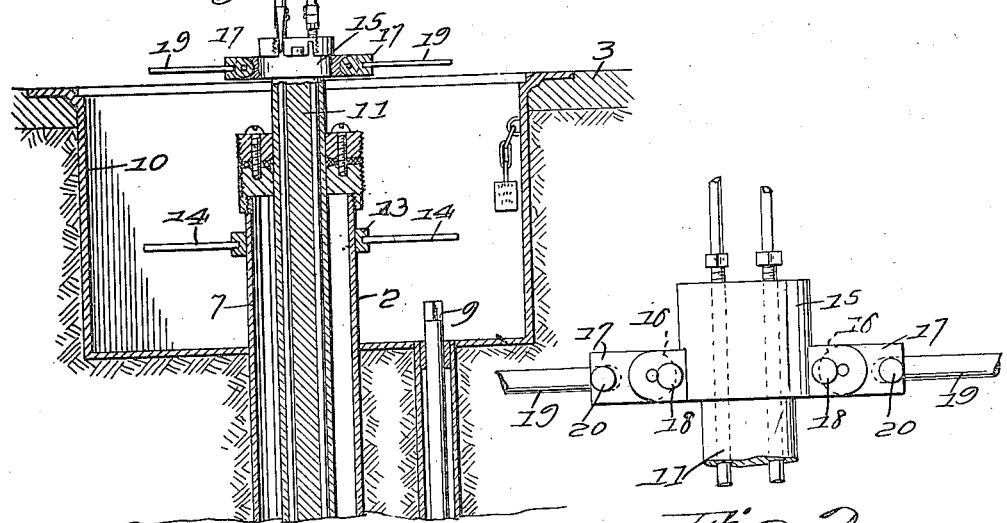
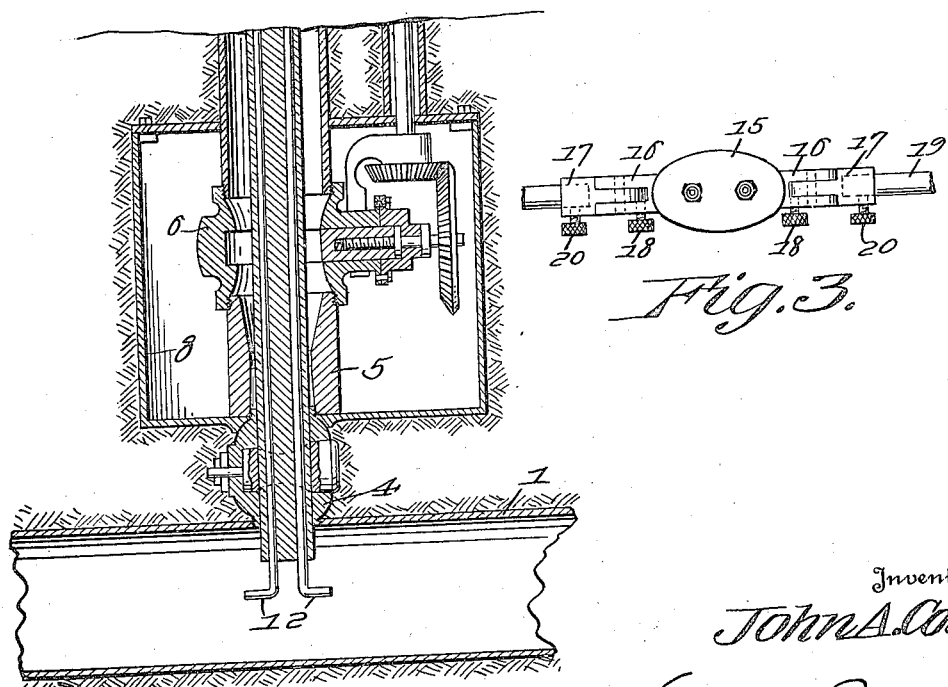
Inventor
John A. Cole
By George K. Prevost
Attorney Patented Mar. 4, 1924.

1,485,831

UNITED STATES PATENT OFFICE.

JOHN ADAMS COLE, OF CHICAGO, ILLINOIS.

MEASURING INSTRUMENT.

Application filed February 7, 1921. Serial No. 443,093.

*To all whom it may concern:*

Be it known that I, JOHN A. COLE, citizen of the United States, residing at Chicago, in the county of Cook and State of Illinois, have invented certain new and useful Improvements in Measuring Instruments; and I do hereby declare the following to be a full, clear, and exact description of the invention, such as will enable others skilled in the art to which it appertains to make and use the same.

This invention relates to improvements in means for measuring the velocity of flowing underground streams.

Where means are provided for measuring the velocity of flowing streams in underground mains, a street connection is usually arranged between the underground main and the surface of the ground or street under which the main runs. These street connections are so devised that a pitometer or rod meter may be inserted from the surface of the ground through the street connection to the interior of the main, so that the tubes of the pitometer or rod meter will be acted upon by the flowing stream and will cause an indicating mechanism to indicate the velocity of the stream.

The mechanism known prior to the present time has not been strictly accurate for the purpose of measuring the stream velocity as it frequently happens that the tubes of the pitometer will be placed in the flowing main and be arranged in a direction which is not parallel with the direction of the stream. Hence, the stream will not strike the tubes directly and as a consequence the indicating mechanism will not accurately indicate the velocity of the stream.

It is the object of the present invention to provide mechanism to indicate to the operator at the surface of the street, the direction of the axis of the main so that the operator may set the rod meter to accurately record the flow of the stream.

With the foregoing objects outlined and with other objects in view which will appear as the description proceeds the invention consists in the novel features hereinafter described in detail, illustrated in the accompanying drawing and more particularly pointed out in the appended claim.

Referring to the drawing:—

Figure 1 is a vertical sectional view of a street connection and main with my improvements applied thereto and showing a rod meter inserted in the street connection and provided with indicating means to assure the operator that the tubes of the rod meter are in exact alignment with the axis of the main.

Fig. 2 is a detail view of the head of the rod meter with the indicating means applied.

Fig. 3 is a detail top plan view of the same.

In the drawing 1 designates an underground main through which water flows and 2 designates a street connection which extends upwardly from the main to a point adjacent the street level 3. The street connection is of known construction and includes a valve fitting 4, a guide tube 5, a second valve 6 and a long conduit 7. The valve 6 is located in a box 8 and the valve is actuated by mechanism connected with an operating stem 9, the latter and the upper end of the long conduit 7 terminating within a street vault 10.

So far described this is all known mechanism and with the known mechanism no means have been provided to indicate to the operator the direction of the axis of the main 1. Consequently when the operator inserts the pitometer or rod meter 11 within the street connection, he could not be assured that the tubes 12 of the meter were in alignment with the axis of the main. Therefore, it frequently happened that the indications obtained by the meter would be inaccurate and would result in false information.

Through experience I have discovered this defect and by the following instrumentalities I have overcome the same. In order to furnish a permanent indication of the direction of the axis of the main I provide the street connection with an adjustable collar 13 having oppositely disposed sockets designed to receive the indicating pointers 14. When the street connection is installed, temporary marks are made on the surface of the street 3 to indicate the direction of the axis of the main. After the earth has been filled in around the street connections, the collar 13 is adjusted so that its sockets are in alignment with the axis designated by the marks on the street surface. The collar is set in this position and when the operator wishes to use the street connection, he places the pointers 14 within the sockets and he then has a visual indication of the direction of the axis of the stream.

In order that the operator may set the rod meter so that its tubes 12 will align with the axis of the main, I have provided the head 15 of the rod meter with oppositely extending bifurcated ears 16 in which are pivotally mounted socket members 17. The socket members may be swung into a position parallel with the axis of the rod meter 11 or they may be arranged perpendicularly to this axis as shown in the drawing, and set screws 18 are employed to lock the same in adjusted positions. Pointer rods 19 are designed to be inserted in the socket members and to be held in position by set screws 20.

With this construction, it will be apparent that by moving the rods 19 into alignment with the rods 14 or into alignment with the temporary or permanent indications placed on the street surface, the tubes 12 will be accurately set for properly indicating the velocity of the flowing stream.

I am aware that various changes may be made in the construction illustrated without departing from the spirit of the invention or sacrificing any of its advantages.

What I claim and desire to secure by Letters Patent is:—

1. The combination with an underground main and a street connection extending therefrom, of a rod-meter extending through said street connection and having apertures arranged within the main, and means for indicating to the operator at the ground surface that the axes of said apertures are in alignment with the axis of the main, said indicating means including socket members pivotally mounted on the rod-meter and pointers insertible into the socket members.

2. The combination with a rod-meter, of pivot pins carried by the rod-meter, a plurality of socket members mounted on said pins and adapted to be moved into positions parallel to or perpendicular to the axis of said meter, and removable pointers carried by said socket members.

3. In combination, an underground main, a street connection extending therefrom, the interior of the main being unobstructed at the point where the street connection is connected to the same, means adjacent to the upper end of the street connection for permanently indicating the direction in which the main extends, a removable rod meter extending through said street connection and having apertures arranged within the main, and means arranged at the upper end of said rod meter and adapted to be brought into register with the indicating means of the street connection for indicating to the operator that the axes of said apertures are in alignment with the axis of the main.

4. The combination with an underground main and a street connection extending from the same, of means arranged near the ground surface for indicating the direction in which the main extends, a removable rod meter extending through said street connection and having apertures arranged within the main, a head mounted on said rod meter, socket members, pivot pins mounted in said head and carrying said socket members, and detachable pointers carried by said sockets and adapted to be brought into register with the indicating means of the street connection for indicating to the operator that the apertures of the meter have their axes in alignment with the axis of the main.

In testimony whereof I affix my signature.

JOHN ADAMS COLE.